United States Patent
Kasahara

(10) Patent No.: US 11,917,116 B2
(45) Date of Patent: Feb. 27, 2024

(54) PRINTING SYSTEM, IMAGE FORMING APPARATUS AND METHOD OF CONTROLLING THE SAME, AND STORAGE MEDIUM

(71) Applicant: CANON KABUSHIKI KAISHA, Tokyo (JP)

(72) Inventor: Aya Kasahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/059,014

(22) Filed: Nov. 28, 2022

(65) Prior Publication Data
US 2023/0209001 A1 Jun. 29, 2023

(30) Foreign Application Priority Data
Dec. 1, 2021 (JP) .................................. 2021-195651

(51) Int. Cl.
*H04N 1/60* (2006.01)
*H04N 1/00* (2006.01)

(52) U.S. Cl.
CPC ....... *H04N 1/6044* (2013.01); *H04N 1/00015* (2013.01); *H04N 1/00023* (2013.01); *H04N 1/00034* (2013.01); *H04N 1/00045* (2013.01); *H04N 1/00074* (2013.01)

(58) Field of Classification Search
CPC ............. H04N 1/6044; H04N 1/00023; H04N 1/00034; H04N 1/00045; H04N 1/603
See application file for complete search history.

(56) References Cited

U.S. PATENT DOCUMENTS

| | | | | |
|---|---|---|---|---|
| 2012/0147398 A1* | 6/2012 | Iguchi | ....................... | B41J 2/32 |
| | | | | 358/1.9 |
| 2014/0176970 A1* | 6/2014 | Iguchi | .................. | H04N 1/6033 |
| | | | | 358/1.9 |
| 2015/0350493 A1* | 12/2015 | Sakatani | .............. | H04N 1/6091 |
| | | | | 358/504 |
| 2016/0063361 A1* | 3/2016 | Hayashi | ............... | G06K 15/129 |
| | | | | 399/39 |
| 2017/0314993 A1* | 11/2017 | Harada | .............. | H04N 1/00045 |
| 2017/0314994 A1* | 11/2017 | Tanimura | ................. | H04N 1/60 |
| 2018/0045572 A1* | 2/2018 | Harada | ...................... | G01J 3/50 |

FOREIGN PATENT DOCUMENTS

| | | | | | |
|---|---|---|---|---|---|
| JP | 2004015299 A | * | 1/2004 | ............. | H04N 1/203 |
| JP | 2014160206 A | * | 9/2014 | ......... | H04N 1/00045 |
| JP | 2019003256 A | * | 1/2019 | | |
| JP | 2019003256 A | | 1/2019 | | |

* cited by examiner

Primary Examiner — Ted W Barnes
(74) Attorney, Agent, or Firm — ROSSI, KIMMS & McDOWELL LLP

(57) ABSTRACT

An image forming apparatus having a plurality of imaging units prints, in a case that a print job received from an information processing apparatus is a print job for printing a chart for adjustment, the chart based on the print job, and decides, based on the chart, which of the plurality of imaging units is to be used to perform colorimetry of a printed product on which the chart has been printed. The image forming apparatus changes a conveyance path of the printed product to use the decided imaging unit for the colorimetry of the printed product, and notifies the information processing apparatus of a result of the colorimetry by the decided imaging unit.

13 Claims, 7 Drawing Sheets

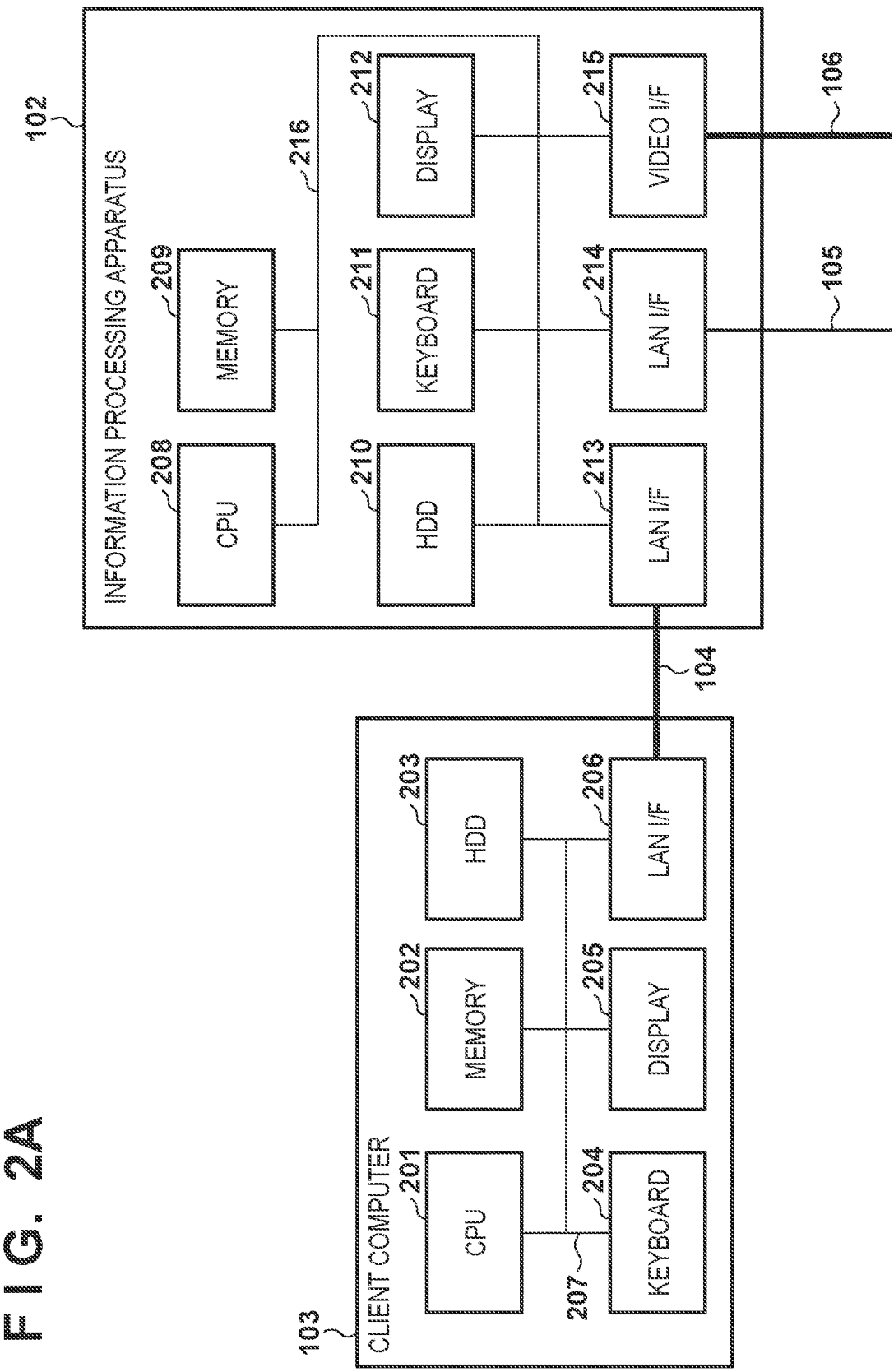

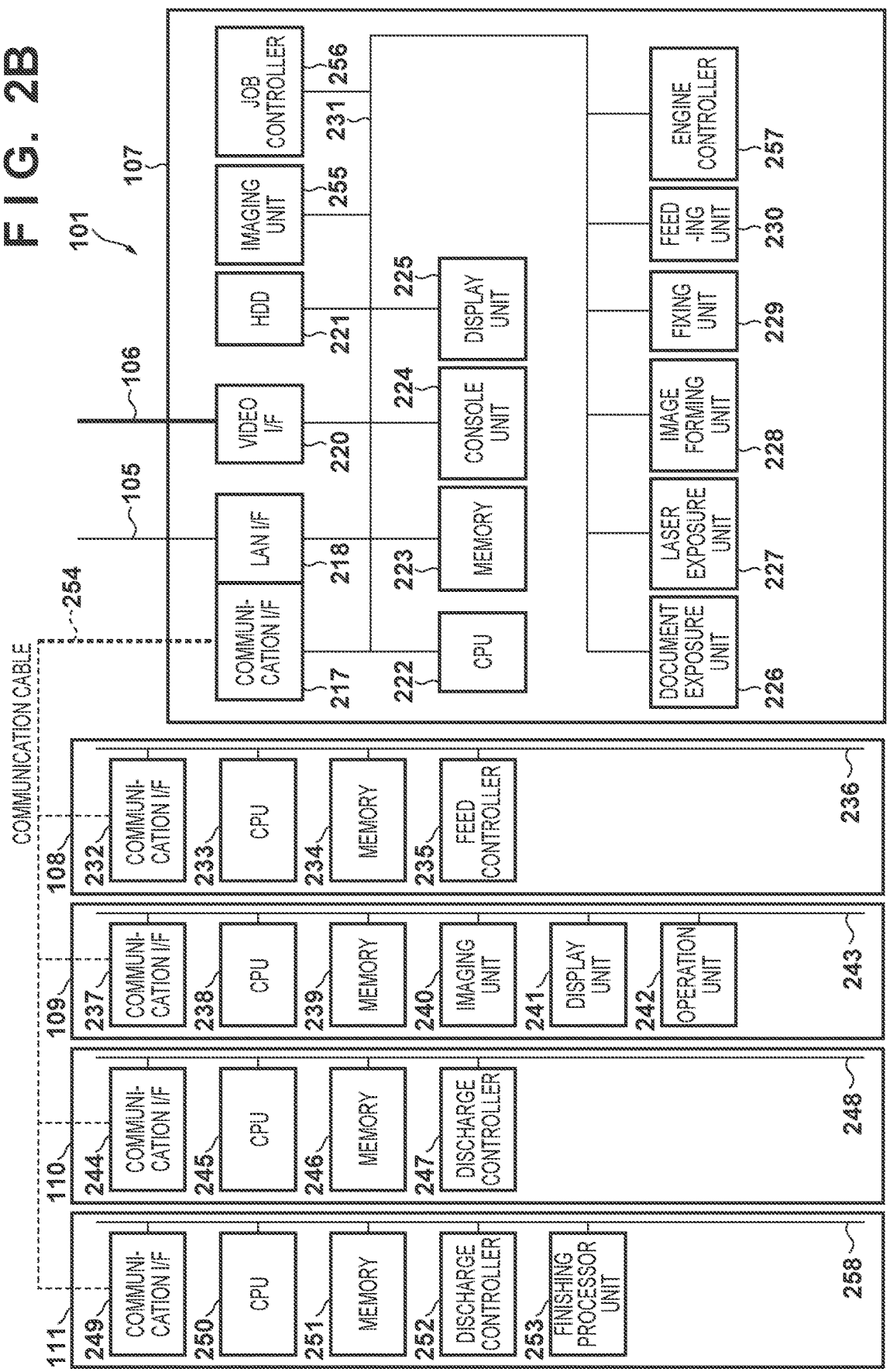

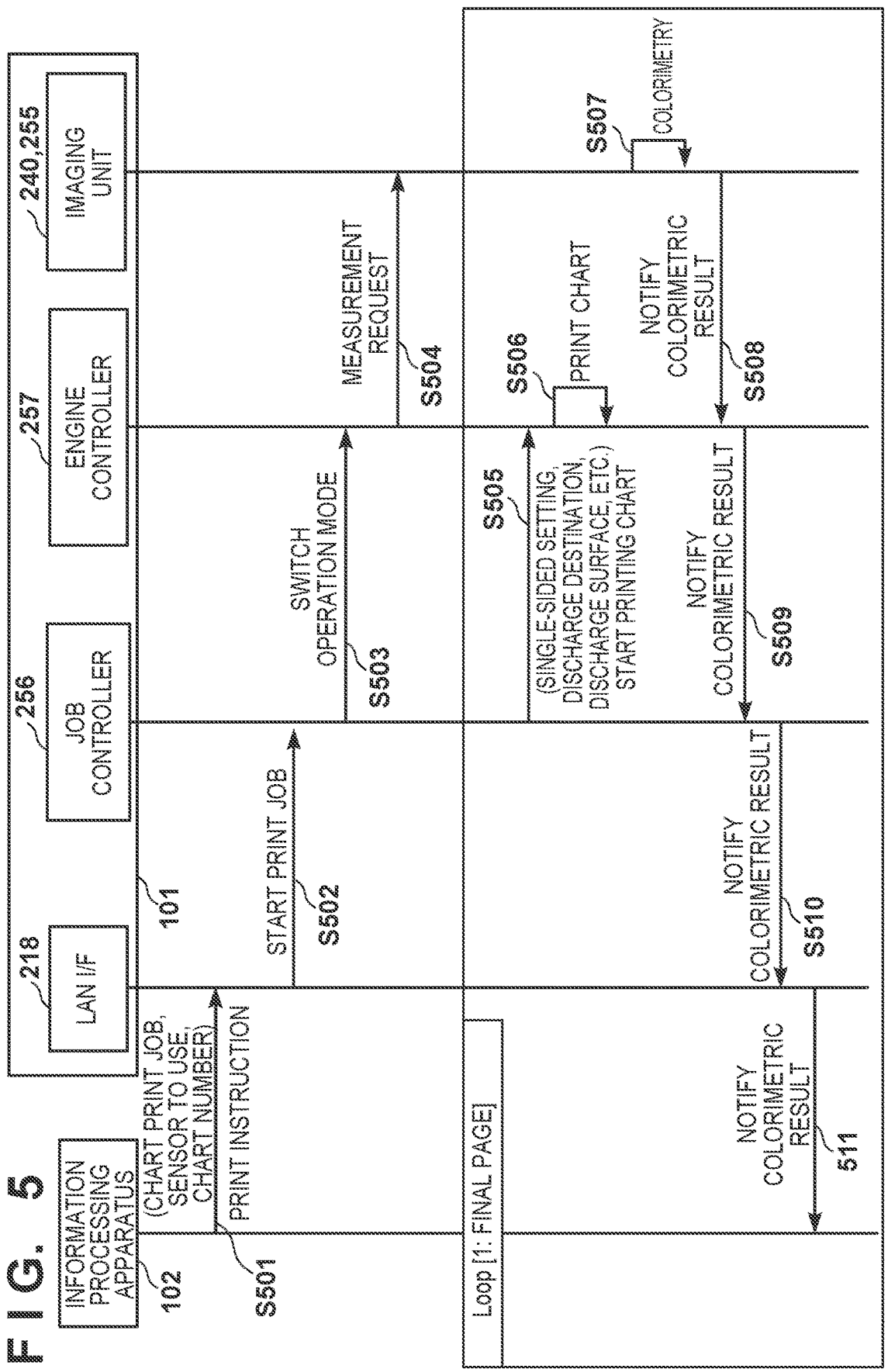

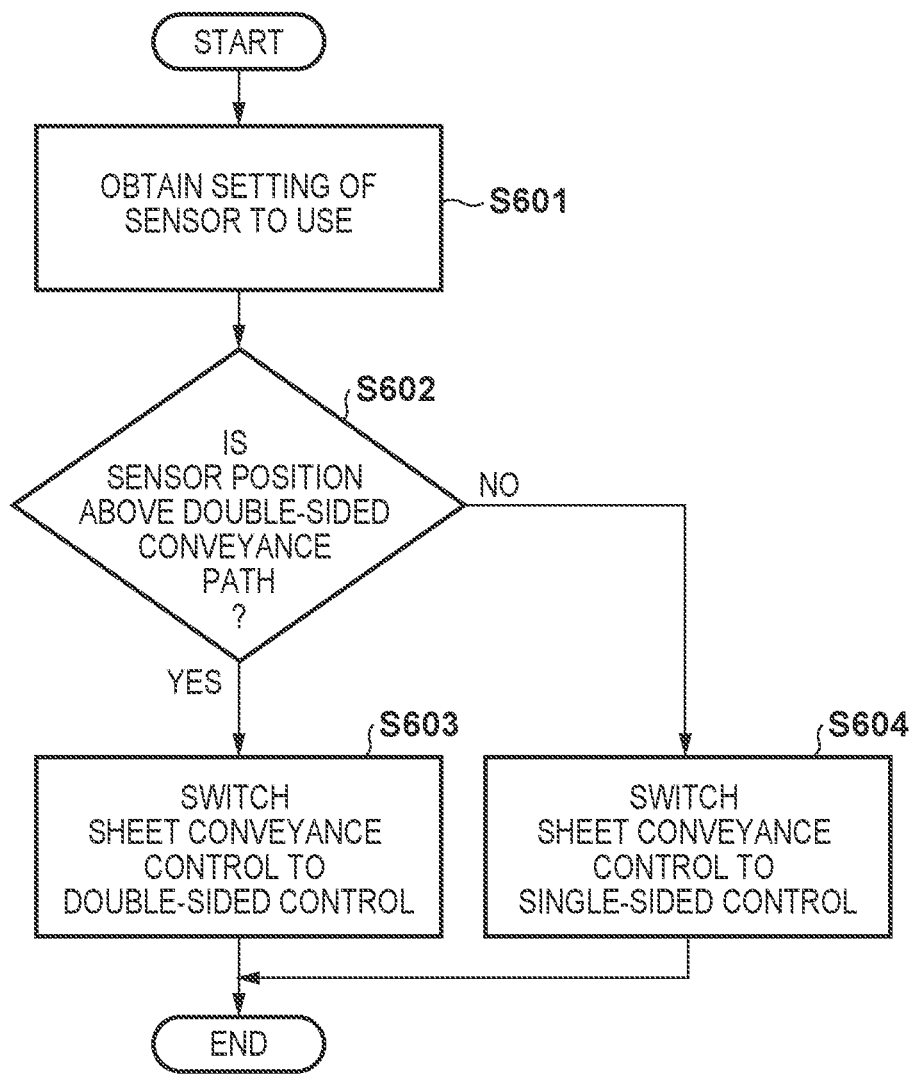

PRINTING SYSTEM, IMAGE FORMING APPARATUS AND METHOD OF CONTROLLING THE SAME, AND STORAGE MEDIUM

BACKGROUND OF THE INVENTION

Field of the Invention

The present invention relates to a printing system, an image forming apparatus and a method of controlling the same, and a storage medium.

Description of the Related Art

In recent years, a commercial electrophotographic image forming apparatus is generally used to make a form of forming a printing system by being connected to an information processing apparatus in order to increase added values. This printing system has an adjustment function (calibration function) for the purpose of stabilizing output image quality. This adjustment function is generally implemented by generating a patch image in accordance with the purpose of adjustment, creating a chart on which the patch image is printed, measuring the chart, and performing adjustment using the measurement result.

The image forming apparatus includes an inline sensor between a discharge destination and a fixing unit on a sheet conveyance path, and can perform colorimetry of a chart by the inline sensor. The use of the inline sensor makes it possible to automatically implement the adjustment function without requiring any operation by a user.

In recent years, various optional apparatuses are connected to a commercial electrophotographic image forming apparatus. One of the optional apparatuses is an inspection apparatus. The inspection apparatus is an apparatus that reads an image on a conveyed print sheet, analyzes the read image, and determines whether the image is normal. A reading sensor mounted on the inspection apparatus can be used not only for inspection but also for colorimetry of the chart. Therefore, in the arrangement in which the inspection apparatus is connected to the image forming apparatus, there exist two sensors that can perform colorimetry of the chart, thereby making it possible to implement various adjustment functions in accordance with the characteristics of the sensors.

Japanese Patent Laid-Open No. 2019-3256 describes a technique in which a user is prompted to designate a sensor to be used for implementation of an adjustment function in a printing system including a plurality of sensors. Japanese Patent Laid-Open No. 2019-3256 describes a method in which when inputting, from an information processing apparatus to an image forming apparatus, a print job to print a chart, the information processing apparatus decides the discharge destination of the printed chart in consideration of the configuration of the image forming apparatus in accordance with the setting of the sensor designated by the user.

According to the method described in Japanese Patent Laid-Open No. 2019-3256, the printing system can decide and control an appropriate discharge destination in accordance with the setting of the sensor designated by the user to implement the adjustment function. In this case, however, the information processing apparatus needs to perform processing by ascertaining the configuration of the image forming apparatus. Since the position of the inline sensor and the presence/absence of an optional apparatus are different for each image forming apparatus, the information processing apparatus needs to implement the logic in consideration of the entire configuration of the image forming apparatuses.

SUMMARY OF THE INVENTION

Embodiments of the present disclosure eliminate the above-mentioned issues with conventional technology.

A feature of embodiments of the present disclosure is to provide a technique of allowing an information processing apparatus to create a print job to print a chart and perform colorimetry without being conscious of the configuration of an image forming apparatus for printing the chart.

According to embodiments of the present disclosure, there is provided an image forming apparatus for receiving a print job from an information processing apparatus and executing the print job, comprising: a plurality of imaging units; one or more memories storing instructions; and one or more processors that execute the instructions being configured to: print, in a case that the print job received from the information processing apparatus is a print job for printing a chart for adjustment, the chart based on the print job, decide, based on the chart, which of the plurality of imaging units is to be used to perform colorimetry of a printed product on which the chart has been printed, change a conveyance path of the printed product to use the decided imaging unit for the colorimetry of the printed product, and notify the information processing apparatus of a result of the colorimetry by the decided imaging unit.

According to embodiments of the present disclosure, there is provided a printing system comprising an image forming apparatus and an information processing apparatus, the image forming apparatus including: a plurality of imaging units; one or more first memories storing instructions; and one or more first processors that execute the instructions being configured to print, in a case that a print job received from the information processing apparatus is a print job for printing a chart for adjustment, the chart based on the print job, decide, based on the chart, which of the plurality of imaging units is to be used to perform colorimetry of a printed product on which the chart has been printed, change a conveyance path of the printed product to use the decided imaging unit for the colorimetry of the printed product, and notify the information processing apparatus of a result of the colorimetry by the decided imaging unit, and the information processing apparatus including: one or more second memories storing instructions; and one or more second processors that execute the instructions being configured to designate the imaging unit to perform the colorimetry of the printed product printed based on the print job for printing the chart for adjustment, and designate an adjustment function to be executed based on a result of the colorimetry by the imaging unit, wherein the print job includes information for designating the imaging unit and information for designating the adjustment function.

According to embodiments of the present disclosure, there is provided a method of controlling an image forming apparatus that includes a plurality of imaging units each configured to read an image of a printed product and perform colorimetry, and receives a print job from an information processing apparatus and executes the print job, the method comprising: printing, in a case that the print job received from the information processing apparatus is a print job for printing a chart for adjustment, the chart based on the print job; deciding, based on the chart, which of the plurality of imaging units is to be used to perform colorimetry of a printed product on which the chart has been printed in the printing; changing a conveyance path of the printed product to use the decided imaging unit for the colorimetry of the printed product; and notifying the information processing apparatus of a result of the colorimetry by the decided imaging unit.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 2A is a block diagram for explaining the system configuration of an information processing apparatus and a client PC according to the embodiment;

FIG. 2B is a block diagram for explaining the system configuration of an image forming apparatus according to the embodiment;

FIG. 5 is a sequence chart for explaining a sequence when a print job including a colorimetric instruction is input from the information processing apparatus to the image forming apparatus according to the embodiment; and FIG. 6 is a flowchart for explaining processing of performing print setting executed in S505 of FIG. 5 by a job controller of the printing apparatus according to the embodiment.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

In the following description, an information processing apparatus will also be referred to as an external controller, an image processing controller, a digital front end, a print server, a data entry facility (DFE), or the like. An image forming apparatus will also be referred to as a multifunction peripheral or an MFP hereinafter.

Figure 1:
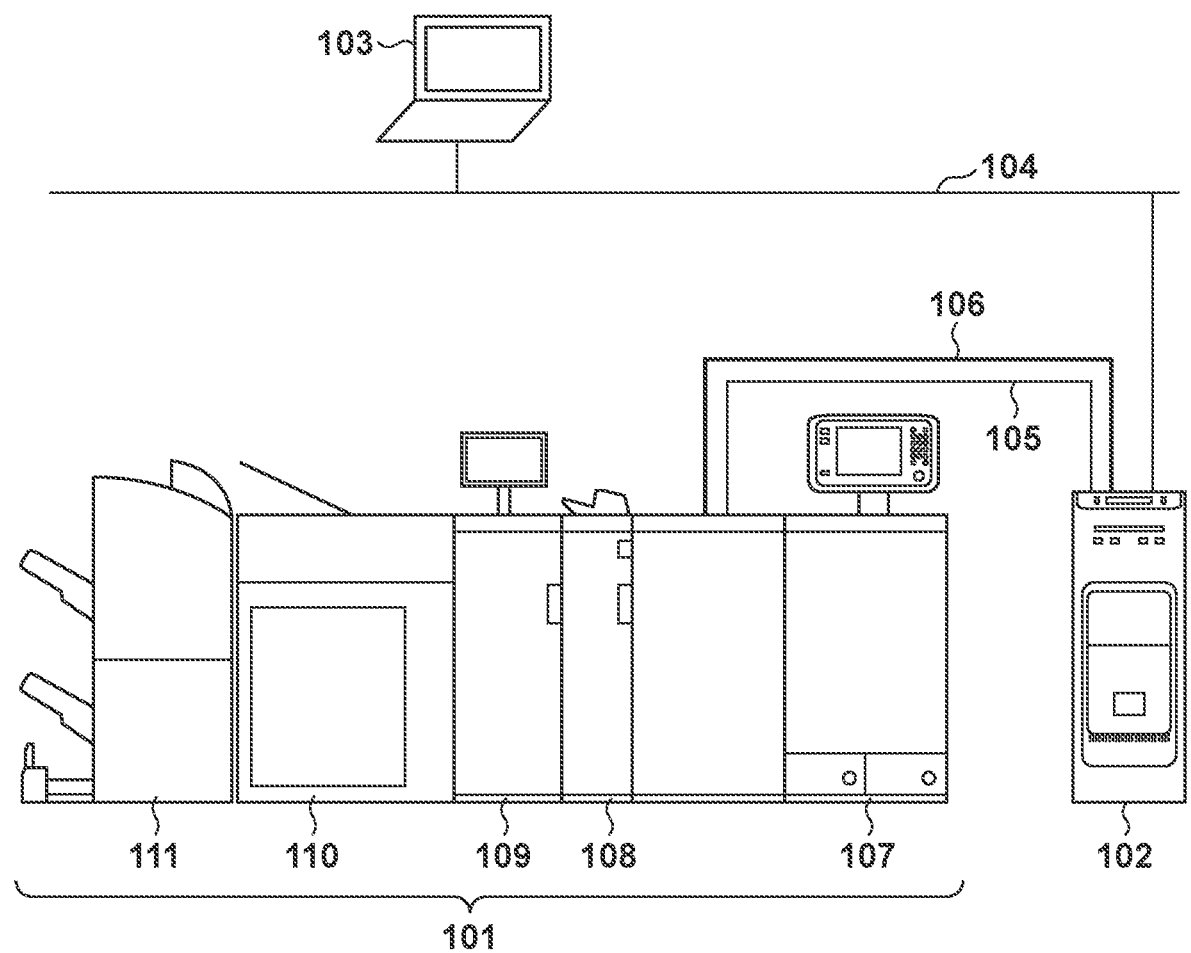
FIG. 1 depicts an overall view of a printing system according to an embodiment of the present invention.

FIG. 1 depicts an overall view of a printing system according to an embodiment of the present invention.

This printing system includes an image forming apparatus 101 and an information processing apparatus 102. The image forming apparatus 101 and the information processing apparatus 102 are communicably connected via an internal LAN 105 and a video cable 106. The information processing apparatus 102 is communicably connected to a client PC 103 via an external LAN 104, and a print instruction is issued from the PC 103 to the information processing apparatus 102. A printer driver having a function of converting print data into data in a print description language (PDL) processable by the information processing apparatus 102 is installed on the client PC 103. The user who executes printing can issue a print instruction from various applications via the printer driver. The printer driver transmits PDL data to the information processing apparatus 102 based on the print instruction from the user. Upon receiving the PDL data from the PC 103, the information processing apparatus 102 performs data analysis and rasterization processing, inputs print data to the image forming apparatus 101, and then issues a print instruction.

The image forming apparatus 101 will be described next.

The image forming apparatus 101 includes a plurality of apparatuses having different functions, and is configured to perform complicated print processing such as bookbinding. A printing apparatus 107 forms, using toner, an image on a sheet conveyed from a feeding unit arranged in the lower portion of the printing apparatus 107. The arrangement and operation principle of the print apparatus 107 are as follows. A photosensitive drum is irradiated with, as scanning light, a light beam such as a laser beam modulated in accordance with image data and reflected by a rotating polygonal mirror such as a polygonal mirror. An electrostatic latent image formed on the photosensitive drum by the laser beam is developed by toner, and the toner image is transferred to an intermediate transfer belt. This series of image forming processes is executed sequentially for toners of yellow (Y), magenta (M), cyan (C), and black (K), thereby forming a full-color image on the intermediate transfer belt. The full-color image is transferred on a sheet and the sheet is transferred to a fixing unit. The fixing unit includes rollers and belts, incorporates a heat source such as a halogen heater in each roller, and melts and fixes, to the sheet, by heat and a pressure, the toners on the sheet to which the toner images have been transferred. An inserter 108 inserts an insertion sheet. The inserter 108 can insert, at an arbitrary position, the insertion sheet to a group of sheets printed in the print apparatus 107 and then conveyed. An inspection apparatus 109 determines whether the printed image is normal or not by reading an image on the conveyed sheet and comparing the read image with a preregistered reference image. The inspection apparatus 109 may be used not only for performing inspection but also for reading a chart image and performing adjustment processing of the information processing apparatus 102 or the printing apparatus 107 using the read data. A large number of sheets can be stacked on a large capacity stacker 110. A finisher 111 executes post-processing processing such as bookbinding, punching, or stapling for the conveyed sheets. The finisher 111 can perform finishing such as stapling, punching, or saddle stitch binding, and discharges the thus obtained sheets to a discharge tray.

The printing system described with reference to FIG. 1 has the arrangement in which the information processing apparatus 102 is connected to the image forming apparatus 101. However, the present invention is not limited to the arrangement in which the information processing apparatus 102 is connected. That is, the image forming apparatus 101 may be connected to the external LAN 104, and print data processible by the image forming apparatus 101 may be transmitted from the client PC 103. In this case, the image forming apparatus 101 performs data analysis and rasterization processing, and then executes print processing.

FIGS. 2A and 2B are block diagrams for explaining the system configuration of the image forming apparatus 101, the information processing apparatus 102, and the client PC 103 according to the embodiment.

The configuration of the printing apparatus 107 of the image forming apparatus 101 will be described with reference to FIG. 2B.

The printing apparatus 107 includes a communication interface (I/F) 217, a LAN I/F 218, a video I/F 220, an HDD 221, a CPU 222, a memory 223, an imaging unit (image reader) 255, a job controller 256, an engine controller 257, a console unit 224, and a display (display unit) 225. Furthermore, the printing apparatus 107 includes a document exposure unit 226, a laser exposure unit 227, an image forming unit 228, a fixing unit 229, and a feeding unit 230. The respective components are connected via a system bus 231. Note that the job controller 256 and the engine controller 257 may be formed by hardware components or may be implemented when the CPU 222 executes programs. The latter case will be described in the following embodiment.

The communication I/F 217 is connected to the inserter 108, the inspection apparatus 109, the large capacity stacker 110, and the finisher 111 via a communication cable 254, and is used to perform communication for controlling each apparatus. The LAN I/F 218 is connected to the information processing apparatus 102 via the internal LAN 105, and is used to communicate print data and the like. The video I/F 220 is connected to the information processing apparatus 102 via the video cable 106, and is used to communicate image data and the like. The HDD 221 is a storage device that saves programs, data, and the like. The CPU 222 collectively controls image processing and printing by deploying, in the memory 223, the programs saved in the HDD 221 and executing the deployed programs. The memory 223 stores programs necessary for the CPU 222 to perform various kinds of processes, and image data, and operates as a work area.

The job controller 256 manages and controls a print job input from the LAN I/F 218 or the console unit 224. The engine controller 257 issues instructions to the document exposure unit 226, the laser exposure unit 227, the image forming unit 228, the fixing unit 229, the feeding unit 230, and the imaging unit 255 based on instructions of the job controller 256. The console unit 224 accepts input of various settings and operation instructions from the user. Setting information set by the information processing apparatus 102, the processing status of a print job, and the like are displayed on the display 225.

The document exposure unit 226 executes processing of reading a document when a copy function or a scan function is used. The document exposure unit 226 reads document data by capturing an image by a CCD camera while illuminating, with an exposure lamp, a sheet set by the user. The laser exposure unit 227 is an apparatus that performs primary charge for irradiating the photosensitive drum with a laser beam to transfer a toner image, and laser exposure. The laser exposure unit 227 first performs primary charge of charging the surface of the photosensitive drum to an even negative potential. Next, a laser driver irradiates the photosensitive drum with a laser beam while adjusting the angle of reflection by a polygonal mirror. This neutralizes negative charges in the irradiated portion, thereby forming an electrostatic latent image. The image forming unit 228 is an apparatus for transferring the toner to the sheet, which includes a developing unit, a transfer unit, and a toner replenishment unit, and transfers the toner image on the photosensitive drum to the sheet via a transfer belt. The developing unit forms a visible image by applying the negatively charged toner from a developing cylinder to the electrostatic latent image on the surface of the photosensitive drum. The transfer unit performs primary transfer of transferring the toner on the surface of the photosensitive drum to the transfer belt by applying a positive potential to a primary transfer roller, and secondary transfer of transferring the toner on the transfer belt to the sheet by applying a positive potential to a secondary transfer roller. The fixing unit 229 is an apparatus that melts and fixes, to the sheet, the toner on the sheet by heat and a pressure, and includes a heater, a fixing belt, and a pressure belt. The feeding unit 230 is an apparatus that feeds a sheet, and controls a feeding operation and a conveyance operation of the sheet using the rollers and various sensors. The imaging unit 255 is installed at a position, after the fixing unit 229, on a conveyance path through which the feeding unit 230 conveys the sheet, and captures the conveyed sheet based on an instruction of the CPU 222.

The configuration of the inserter 108 of the image forming apparatus 101 will be described next.

The inserter 108 includes a communication I/F 232, a CPU 233, a memory 234, and a feed controller 235, and these components are connected via a system bus 236. The communication I/F 232 is connected to the printing apparatus 107 via the communication cable 254, and performs communication necessary for control. The CPU 233 performs various control operations necessary for feeding a sheet in accordance with a control program stored in the memory 234. The memory 234 is a storage device that saves the control program. The feed controller 235 controls feed and conveyance of the sheet conveyed from the feeding unit of the inserter or the printing apparatus 107 while controlling the rollers and sensors based on an instruction from the CPU 233.

The configuration of the inspection apparatus 109 of the image forming apparatus 101 will be described next.

The inspection apparatus 109 includes a communication I/F 237, a CPU 238, a memory 239, an imaging unit (image reader) 240, a display unit 241, and an operation unit 242, and these components are connected via a system bus 243. The communication I/F 237 is connected to the printing apparatus 107 via the communication cable 254, and performs communication necessary for control. The CPU 238 performs various control operations necessary for inspection in accordance with a control program stored in the memory 239. The memory 239 is a storage device that saves the control program and the like. The imaging unit 240 captures the conveyed sheet in accordance with an instruction of the CPU 238. If inspection is designated by a print instruction, the CPU 238 determines whether the printed image is normal by comparing the image captured by the imaging unit 240 with a reference image saved in the memory 239. An inspection result, a setting screen, and the like are displayed on the display unit 241. The operation unit 242 is operated by the user and accepts instructions such as a setting change instruction of the inspection apparatus 109 and a registration instruction of the reference image. If chart printing is designated by a print instruction, the CPU 238 creates colorimetry data from the image captured by the imaging unit 240, and transmits the created colorimetry data to the printing apparatus 107 via the communication I/F 237.

The configuration of the large capacity stacker 110 of the image forming apparatus 101 will be described next.

The large capacity stacker 110 includes a communication I/F 244, a CPU 245, a memory 246, and a discharge controller 247, and these components are connected via a system bus 248. The communication I/F 244 is connected to the printing apparatus 107 via the communication cable 254, and performs communication necessary for control. The CPU 245 executes a control program stored in the memory 246, thereby performing various control operations necessary for discharge. The memory 246 is a storage device that saves the control program and the like. The discharge controller 247 executes control of conveying the conveyed sheet to a stack tray, an escape tray, or the subsequent finisher 111 based on an instruction from the CPU 245.

The configuration of the finisher 111 of the image forming apparatus 101 will be described next.

The finisher 111 includes a communication I/F 249, a CPU 250, a memory 251, a discharge controller 252, and a finishing processor 253, and these components are connected via a system bus 258. The communication I/F 249 is connected to the printing apparatus 107 via the communication cable 254, and performs communication necessary for control. The CPU 250 performs various control operations necessary for finishing or discharge in accordance with a control program stored in the memory 251. The memory 251 is a storage device that saves the control program and the like. The discharge controller 252 controls conveyance of a sheet and discharge of a bundle of sheets or the sheets based on an instruction from the CPU 250. The finishing processor 253 controls finishing processing such as stapling, punching, or saddle stitch binding based on an instruction from the CPU 250.

The configuration of the information processing apparatus 102 will be described next with reference to FIG. 2A.

The information processing apparatus 102 includes a CPU 208, a memory 209, an HDD 210, a keyboard 211, a display 212, LAN I/Fs 213 and 214, and a video I/F 215, which are connected via a system bus 216. The CPU 208 collectively executes processing such as reception of print data from the client PC 103, RIP processing, and transmission of print data to the image forming apparatus 101 based on programs and data saved in the HDD 210 and deployed in the memory 209. The memory 209 stores programs and data necessary for the CPU 208 to perform various kinds of processes, and operates as a work area. The HDD 210 stores programs and data necessary for an operation such as a print processing. The keyboard 211 is an apparatus used to input an operation instruction of the information processing apparatus 102. Information of an execution application of the information processing apparatus 102 or the like is displayed on the display 212 by a video signal of a moving image or a still image. The LAN I/F 213 is connected to the client PC 103 via the external LAN 104, and is used to communicate a print instruction and the like. The LAN I/F 214 is connected to the image forming apparatus 101 via the internal LAN 105, and is used to communicate a print instruction and the like. The video I/F 215 is connected to the image forming apparatus 101 via the video cable 106, and is used to communicate print data and the like.

The configuration of the client PC 103 will be described next.

The client PC 103 includes a CPU 201, a memory 202, an HDD 203, a keyboard 204, a display 205, and a LAN I/F 206, which are connected via a system bus 207. The CPU 201 creates print data and executes a print instruction based on a document processing program or the like saved in the HDD 203. The CPU 201 collectively controls the respective devices connected to the system bus 207. The memory 202 stores programs and data necessary for the CPU 201 to perform various kinds of processes, and operates as a work area. The HDD 203 stores programs and data necessary for an operation such as print processing. The keyboard 204 is an apparatus used to input an operation instruction of the PC 103. Information of an execution application of the client PC 103 or the like is displayed on the display 205 by a video signal of a moving image or a still image. The LAN I/F 206 is connected to the external LAN 104, and is used to communicate print data and a print instruction and the like.

In the above description, the information processing apparatus 102 and the image forming apparatus 101 are connected by the internal LAN 105 and the video cable 106. However, any arrangement in which data necessary for printing can be transmitted/received is possible, and for example, an arrangement in which only the video cable is connected may be adopted. Each of the memories 202, 209, 223, 234, 239, 246, and 251 need only be a storage device that holds data and programs. For example, each memory may be replaced by a volatile RAM, a nonvolatile ROM, an internal HDD, an external HDD, a USB memory, or the like.

Figure 3A:
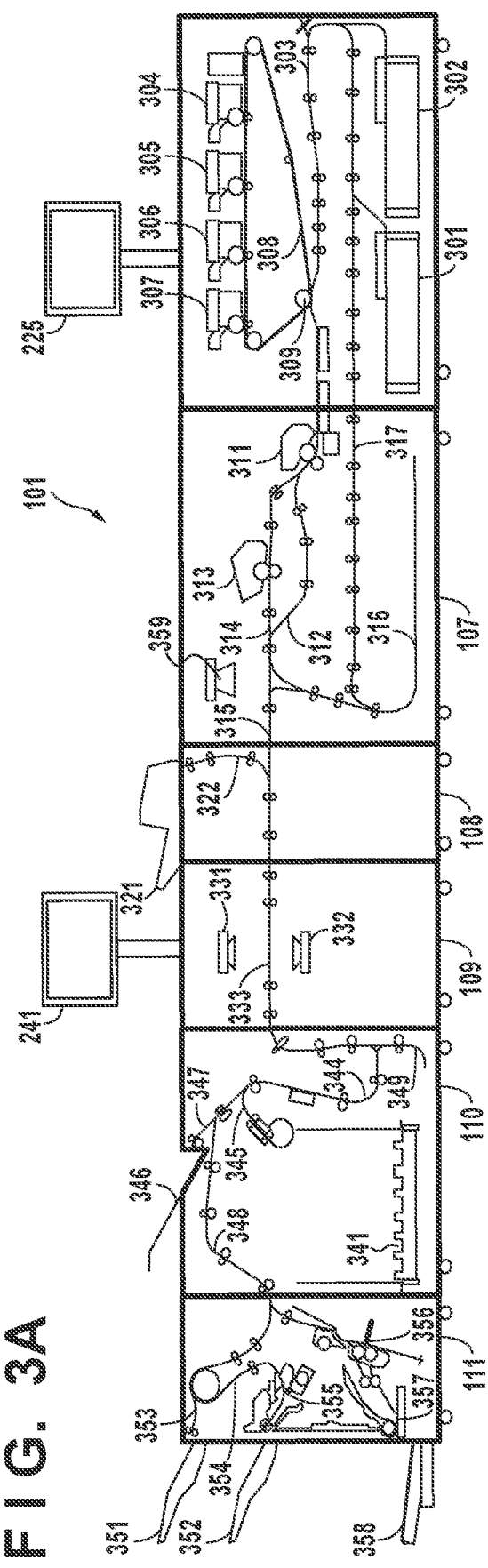
FIGS. 3A and 3B depict schematic sectional views each showing the image forming apparatus according to the embodiment.
Figure 3B:
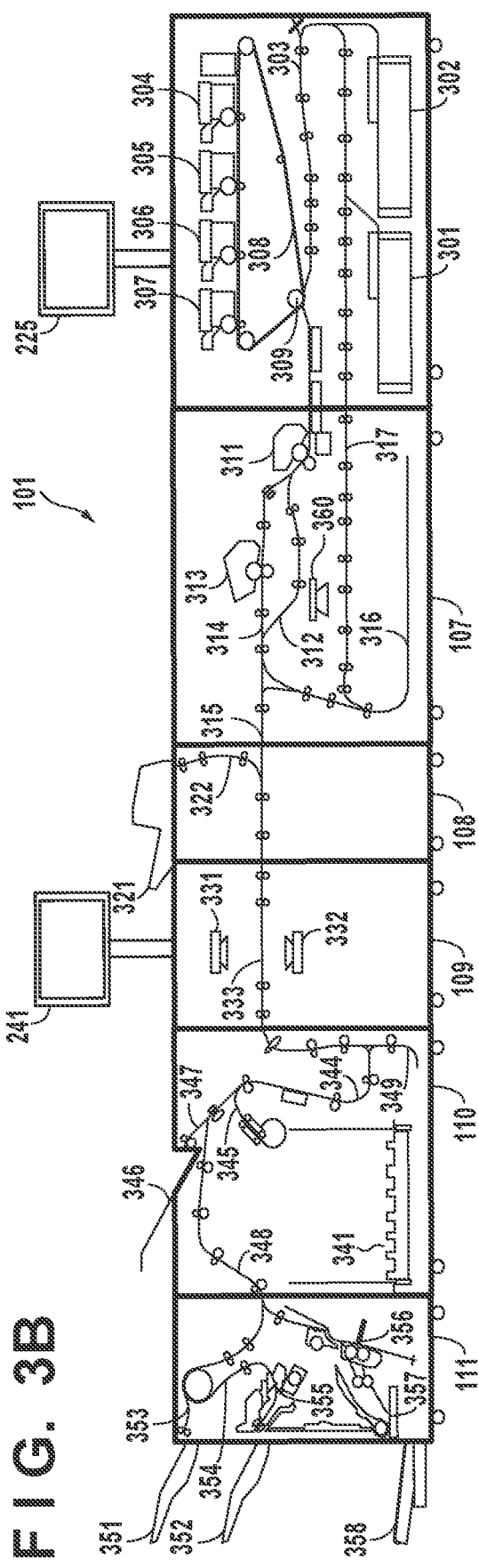

FIG. 3A depicts a schematic sectional view of the image forming apparatus 101 according to the embodiment. In FIGS. 3A and 3B, the same reference numerals as in FIGS. 1 and 2 described above denote the same parts and a description thereof will be omitted.

Various kinds of sheets can be stored in feed decks 301 and 302. Information (sheet size and sheet type) of sheets stored in each feed deck can be set from the console unit 224 of the printing apparatus 107. In each feed deck, only the uppermost sheet of the stored sheets can be separated and conveyed to a sheet conveyance path 303. Reference numerals 304 to 307 denote developing stations that form toner images using color toners of Y, M, C, and K, respectively, to form a color image. The formed toner images undergo primary transfer to an intermediate transfer belt 308. The intermediate transfer belt 308 rotates clockwise in FIG. 3A or 3B, thereby transferring, at a secondary transfer position 309, the toner images to the sheet conveyed from the sheet conveyance path 303. The display 225 displays the print status of the image forming apparatus 101 and information for setting. A fixing unit 311 fixes the toner images to the sheet. The fixing unit 311 includes a pressure roller and a heating roller, and fixes the toner images to the sheet by melting/pressing the toners when the sheet passes between the rollers. The sheet having passed through the fixing unit 311 is conveyed to a conveyance path 315 through a sheet conveyance path 312. If further melting/pressing is required for fixing in accordance with the type of sheet, the sheet having passed through the fixing unit 311 is conveyed to a second fixing unit 313 via an upper sheet conveyance path, additionally melted/pressed, and then conveyed to the conveyance path 315 through a sheet conveyance path 314. If an image formation mode is a double-sided mode, the sheet including one side on which the toner images have been fixed is conveyed to a sheet inverting path 316, inverted in the inverting path 316, and then conveyed to a double-sided conveyance path 317. Then, an image of the second surface of the sheet is transferred at the secondary transfer position 309. A camera 359 (corresponding to the imaging unit 255) is mounted above the conveyance path between the sheet conveyance path 314 and the conveyance path 315, and can read the upper surface of the sheet conveyed through the conveyance path.

The inserter 108 includes an inserter tray 321 on which an insertion sheet is stacked, and makes the insertion sheet fed through a sheet conveyance path 322 merge with a conveyance path. This makes it possible to insert, at an arbitrary position, the insertion sheet to the group of sheets conveyed from the print apparatus 107, and convey the sheets to a subsequent apparatus.

The sheets having passed through the inserter 108 are conveyed to the inspection apparatus 109. Cameras 331 and 332 are arranged in the inspection apparatus 109 to face each other. The camera 331 is a camera used to read the upper surface of the sheet, and the camera 332 is a camera used to read the lower surface of the sheet. The inspection apparatus 109 can read the image of the sheet using the camera 331 and/or 332 at a timing when the sheet conveyed to a sheet conveyance path 333 reaches a predetermined position, and determine whether the printed image is normal. The result of inspection performed by the inspection apparatus 109 and the like are displayed on the display unit 241.

The large capacity stacker 110 includes a stack tray 341 as a tray on which a sheet is stacked. The sheet having passed through the inspection apparatus 109 is input to the large capacity stacker 110 through a sheet conveyance path 344. The sheet is conveyed from the sheet conveyance path 344 via a sheet conveyance path 345, and stacked on the stack tray 341. The stacker 110 further includes an escape tray 346 as a discharge tray. The escape tray 346 is a discharge tray used to discharge a sheet which has been determined as a defective sheet by the inspection apparatus 109. When outputting the sheet to the escape tray 346, the sheet is conveyed from the sheet conveyance path 344 to the escape tray 346 via a sheet conveyance path 347. Note that when conveying the sheet to the finisher 111 of the succeeding stage of the large capacity stacker 110, the sheet is conveyed via a sheet conveyance path 348. An inverting unit 349 is used to invert the sheet. This inverting unit 349 is used to stack the sheet on the stack tray 341. When stacking the sheet on the stack tray 341, the sheet is inverted in the inverting unit 349 so that the direction of the input sheet is the same as that of the sheet at the time of output. When conveying the sheet to the escape tray 346 or the subsequent finisher 111, the sheet is discharged intact without being flipped at the time of stacking, and thus the inverting operation in the inverting unit 349 is not performed.

The finisher 111 executes finishing processing for the conveyed sheets in accordance with a function designated by the user. The finisher 111 has finishing functions such as a stapling function (1- or 2-point stapling), a punching function (two or three holes), and a saddle stitch binding function. The finisher 111 includes two discharge trays 351 and 352, and outputs the sheets to the discharge tray 351 via a sheet conveyance path 353. However, the finishing processing such as stapling processing cannot be performed in the sheet conveyance path 353. If the finishing processing such as stapling processing is performed, the finishing processing designated by the user is executed in a processing unit 355 through a sheet conveyance path 354, and then the processed sheets are output to the discharge tray 352. Each of the discharge trays 351 and 352 is configured to be movable vertically. The finisher 111 can also operate to stack, on the discharge tray 351, the sheets having undergone the finishing processing by the processing unit 355 by moving the discharge tray 351 downward. If the saddle stitch binding processing is designated, stapling processing is performed at the center of the sheets in a saddle stitch processing unit 356, and then the sheets are two-folded and output to a saddle stitch binding tray 358 via a sheet conveyance path 357. The saddle stitch binding tray 358 has a belt conveyer arrangement that conveys a saddle-stitched sheet bundle stacked on the saddle stitch binding tray 358 to the left side.

FIG. 3B depicts a schematic sectional view of another image forming apparatus that provides the same function as in FIG. 3A, and is different from FIG. 3A in terms of a mounting position of the camera 359. That is, in FIG. 3B, a camera 360 (corresponding to the imaging unit 255) is mounted at a position, after the sheet inverting path 316, above a sheet conveyance path. In this case, if it is desirable to perform imaging by the camera 360, it is necessary to control double-sided circulation to make the sheet pass through the sheet inverting path 316.

In the arrangement shown in FIG. 3A, it is possible to read, on the single-sided conveyance path, the chart printed on one side. To the contrary, in the arrangement shown in FIG. 3B, even for the chart printed on one side, it is necessary to control double-sided circulation. As described above, the mounting position of the camera may be decided based on a physical situation, and it may be necessary to change sheet conveyance control in accordance with the decided mounting position.

A sensor mounted on each camera will be described. As sensors mounted on the cameras 331, 332, 359, 360 described with reference to FIGS. 3A and 3B, identical sensors or different sensors may be used. As for the sensors, for example, the number of sensors are different, different reading methods including a method of performing colorimetry by the fixedly arranged sensor while conveying a sheet and a method of performing colorimetry by a movable sensor while stopping conveyance of a sheet are used, and the colorimetric accuracy is different. In consideration of the above differences among the sensors, a sensor to be used appropriately is decided based on a target adjustment function. For example, if it is desirable to perform colorimetry accurately even if it takes a relatively long time, an accurate movable sensor is preferably used. On the other hand, if a single-color patch is used and not so high accuracy is required, the processing time is shortened by using a fixedly arranged sensor. To perform adjustment, association between a chart to be read and a sensor for colorimetry is decided in advance for each model in consideration of the above characteristics.

Figure 4:
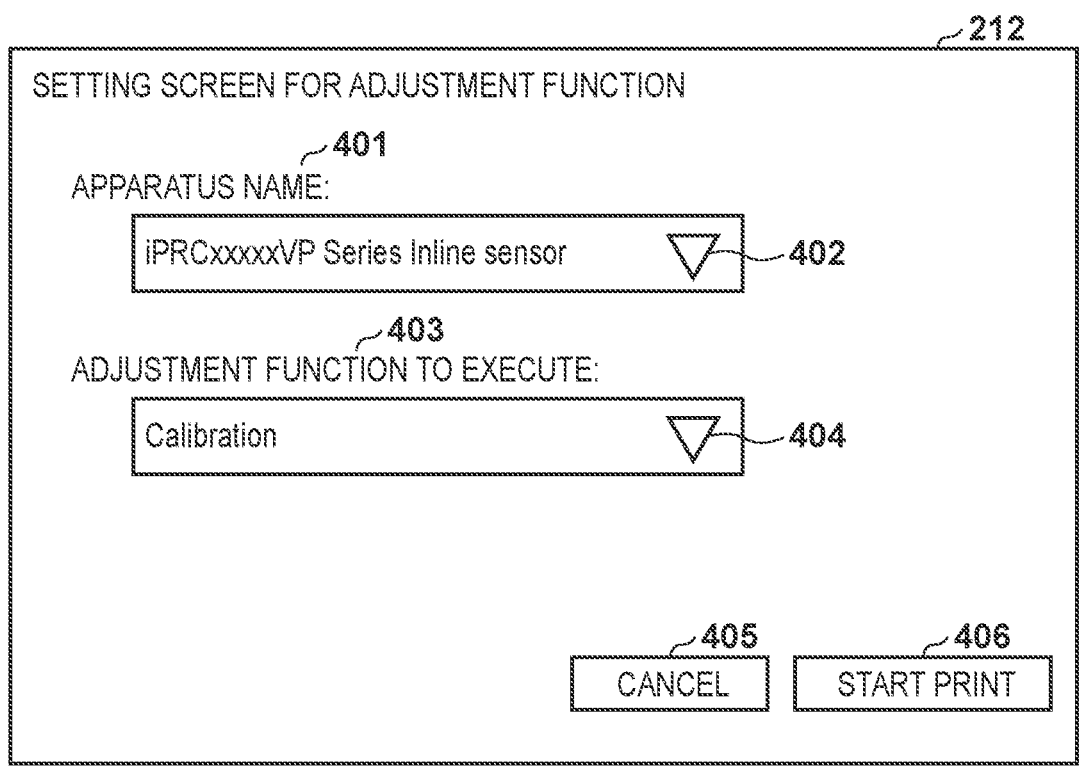
FIG. 4 depicts a view showing an example of a UI screen displayed on a display for setting an adjustment function in the information processing apparatus according to the embodiment.

FIG. 4 depicts a view showing an example of a UI screen displayed on the display 212 for setting the adjustment function in the information processing apparatus 102 according to the embodiment.

This UI screen is displayed on the display 212 in response to an instruction of the CPU 208 of the information processing apparatus 102, and the user can change the setting of the adjustment function using the keyboard 211, a pointing device, or the like. The CPU 208 receives an instruction from the user at an arbitrary timing, and displays the UI screen to accept various setting changes.

In an apparatus name 401, an apparatus in which a sensor for colorimetry is arranged is designated. Upon pressing an area 402, a list of apparatus names to be referred to for selection is displayed. If a sensor (the camera 359 in the case shown in FIG. 3A or the camera 360 in the case shown in FIG. 3B) arranged in the printer engine of the image forming apparatus 101 is used, the name of the image forming apparatus 101 is selected.

On the other hand, if the cameras 331 and 332 arranged in the inspection apparatus 109 are used as sensors for colorimetry, the name of the inspection apparatus 109 is selected.

In an execution adjustment function 403, an adjustment function to be executed is designated. Upon pressing an area 404, choices are displayed to select the adjustment function, and the user designates the adjustment function to be executed from the displayed choices. In accordance with the selected adjustment function, a chart image to be printed and undergo colorimetry is uniquely decided. The chart image is assigned in advance with a chart identifier, and the information processing apparatus 102 and the image forming apparatus 101 executes control to implement the adjustment function based on the identifier. Upon pressing a cancel button 405, the setting in this screen is canceled and terminated. Upon pressing a print start button 406, the information processing apparatus 102 generates a print job including information of the apparatus designated in the apparatus name 401, information of the chart identifier, and other setting items necessary for printing, and transmits the generated print job to the image forming apparatus 101 via the LAN I/F 214. Print data of the chart image corresponding to the chart identifier is transmitted to the image forming apparatus 101 via the video I/F 215 and the video cable 106.

FIG. 5 is a sequence chart for explaining a sequence when a print job including a colorimetric instruction is input from the information processing apparatus 102 to the image forming apparatus 101 according to the embodiment. These processes are implemented when the CPU 208 of the information processing apparatus 102 and the CPU 222 of the image forming apparatus 101 deploy programs saved in the HDDs 210 and 221 in the memories 209 and 223 and execute them, respectively.

In S501, upon pressing the print start button 406 in the screen shown in FIG. 4, the information processing apparatus 102 generates a print job, as described above, and transmits it to the image forming apparatus 101 via the LAN I/F 214. At this time, the settings of the print job include a setting indicating a chart print job, a sensor to be used for colorimetry, and information of a chart identifier (identification information). In addition, a sheet to be used for printing, a discharge destination, an orientation (discharge surface) of the surface of the sheet at the time of discharge, information indicating whether the print data of the chart image is single-sided data, and the like are included. There are a plurality of additional setting items necessary for printing but a description thereof will be omitted. The information processing apparatus 102 transmits the print data of the chart image corresponding to the chart identifier to the image forming apparatus 101 via the video I/F 215 and the video cable 106.

In S502, the LAN I/F 218 of the image forming apparatus 101 notifies the job controller 256 of the print settings and print data included in the print job received from the information processing apparatus 102, and instructs to start the chart print job.

In S503, the job controller 256 notifies the engine controller 257 of switching of an operation mode. This operation mode indicates a mode of executing normal printing or a chart print mode of printing the chart for adjustment. At this time, the engine controller 257 is also notified of the chart identifier sent from the information processing apparatus 102.

Next, in S504, if the operation mode is the chart print mode of printing the chart for adjustment, the engine controller 257 decides, based on the information of the chart identifier, a sensor to perform colorimetry of the chart. Then, the engine controller 257 notifies an imaging unit (the imaging unit 255 of the printing apparatus 107 or the imaging unit 240 of the inspection apparatus 109) including the sensor of a colorimetric request. Assume that association between the chart identifier and the sensor for colorimetry is decided in advance between the information processing apparatus 102 and the image forming apparatus 101 for each model. The example in which the information of the chart identifier is used has been exemplified but an imaging unit may be notified of a colorimetric request using the information of the sensor for colorimetry.

In S505, the job controller 256 instructs the engine controller 257 to start printing of the chart. At this time, the job controller 256 changes necessary setting parameters based on the setting of the sensor of the print job input from the information processing apparatus 102 in S501, and notifies the engine controller 257 of them. Details of them will be described later with reference to a flowchart shown in FIG. 6.

In S506, the engine controller 257 feeds a sheet based on the instruction from the job controller 256, and prints the chart image including the patch image on the sheet, thereby obtaining a printed product. If the instruction from the job controller 256 indicates single-sided control, the engine controller 257 prints the chart image on the surface of the sheet, and then conveys the sheet to the sheet conveyance paths 314 and 315.

On the other hand, if the instruction from the job controller 256 indicates double-sided control, the engine controller 257 prints the chart image on the surface of the sheet, and then conveys the sheet to the inverting path 316. At this time, sheet conveyance is performed by double-sided control but the print data is single-sided data. Therefore, when the sheet passes through the secondary transfer position 309 again after passing through the inverting path 316, no toner images are formed on the intermediate transfer belt 308, thereby controlling not to print on the back surface.

In S507, the imaging unit (255 or 240) requested to perform colorimetry in S504 reads the chart image when the sheet on which the patch image has been printed passes through the position of the sensor, and performs colorimetry of the patch image.

In S508, the imaging unit (255 or 240) notifies the engine controller 257 of the colorimetric result of the patch image. In S509, the engine controller 257 notifies the job controller 256 of the colorimetric result of the patch image. In S510, the job controller 256 notifies the LAN I/F 218 of the colorimetric result of the patch image. In S511, the LAN I/F 218 notifies the information processing apparatus 102, which has issued the chart print instruction, of the colorimetric result of the patch image via the LAN 105.

The image forming apparatus 101 repeats the processes in S505 to S511 the number of times that is equal to the number of pages for which the print instruction has been issued by the information processing apparatus 102 in S501. The information processing apparatus 102 issues the chart print instruction, obtains the colorimetric result of the patch image of the printed chart image, and executes calibration based on the obtained colorimetric result.

As described above, with the arrangement of the image forming apparatus 101, even if different sheet conveyance control is required in accordance with the mounting position of the camera, the information processing apparatus 102 need not intentionally set single-sided control, and can perform colorimetry by a desired camera by only setting the sensor to be used.

Note that the example in which the image forming apparatus 101 decides the single-sided setting in accordance with the arrangement shown in FIG. 3A or 3B has been described above. However, other print settings such as a discharge destination setting and a discharge surface setting may be inconsistent with the sensor to be used, the same control is performed.

FIG. 6 is a flowchart for explaining processing of performing print setting executed in S505 by the job controller 256 of the printing apparatus 107 according to the embodiment. Note that the processing described by the flowchart is implemented when the CPU 222 of the image forming apparatus 101 executes the program deployed in the memory 223. Note also that this flowchart is implemented when the CPU 222 functions as the job controller 256.

In step S601, the CPU 222 confirms the settings of the print job input from the information processing apparatus 102 in S501, and obtains a setting of the sensor to be used for colorimetry. The process advances to step S602, and the CPU 222 determines whether the position of the sensor to be used for colorimetry is above the double-sided conveyance path. The determination is made based on information held in advance as apparatus information in the HDD 221. If the CPU 222 determines that the sensor is mounted above the double-sided conveyance path, the process advances to step S603 to set the sheet conveyance control setting to a double-sided control setting, thereby ending the processing. A case in which the sensor is mounted above the double-sided conveyance path indicates a case in which a setting of using the camera 360 of the printing apparatus 107 shown in FIG. 3B is made.

On the other hand, if the CPU 222 determines in step S602 that the sensor is not mounted above the double-sided conveyance path, the process advances to step S604 to set the sheet conveyance control setting to a single-sided control setting, thereby ending the processing. A case in which the sensor is not mounted above the double-sided conveyance path indicates a case in which a setting of using the camera 359 of the printing apparatus 107 in FIG. 3A is made.

Therefore, for example, if the image forming apparatus 101 has the arrangement shown in FIG. 3A, the camera 359 of the printing apparatus 107 and the cameras 331 and 332 of the inspection apparatus 109 are not mounted above the double-sided conveyance path, and thus the sheet conveyance control setting is set to the single-sided control setting. On the other hand, if the image forming apparatus 101 has the arrangement shown in FIG. 3B, the camera 360 of the printing apparatus 107 is mounted above the double-sided conveyance path, and thus the sheet conveyance control setting is set to the double-sided control setting.

According to the above-described embodiment, with the arrangement of the image forming apparatus, even if different sheet conveyance control is required in accordance with the mounting position of the camera, the information processing apparatus need not intentionally make the single-sided/double-sided setting, and can perform colorimetry by a desired camera by only setting a sensor to be used for a print job.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-195651, filed Dec. 1, 2021, which is hereby incorporated by reference herein in its entirety.

What is claimed is:

1. An image forming apparatus for receiving a print job from an information processing apparatus and executing the print job, comprising:
   a plurality of imaging units;
   one or more memories storing instructions; and
   one or more processors that execute the instructions being configured to:
   print, in a case that the print job received from the information processing apparatus is a print job for printing a chart for adjustment, the chart based on the print job,
   decide, based on the chart, which of the plurality of imaging units is to be used to perform colorimetry of a printed product on which the chart has been printed,
   change a conveyance path of the printed product to use the decided imaging unit for the colorimetry of the printed product, and
   notify the information processing apparatus of a result of the colorimetry by the decided imaging unit.

2. The image forming apparatus according to claim 1, wherein the print job includes information for designating the imaging unit to be used for the colorimetry.

3. The image forming apparatus according to claim 1, wherein the print job includes identification information of the chart, and in deciding which of the plurality of imaging units is to be used, the imaging unit to be used for the colorimetry is decided based on the identification information.

4. The image forming apparatus according to claim 3, wherein association between the identification information of the chart and the imaging unit is decided in advance between the information processing apparatus and the image forming apparatus.

5. The image forming apparatus according to claim 3, wherein the identification information of the chart includes information of a sheet to be used by the printed product, a discharge destination and a discharge surface, and information indicating whether print data of the chart is single-sided data.

6. The image forming apparatus according to claim 3, wherein the one or more processors are further configured to:
   store, in a storage unit, information indicating mounting positions of the plurality of imaging units,
   wherein in changing the conveyance path of the printed product, the conveyance path of the printed product is changed based on the information indicating the mounting position of the decided imaging unit stored in the storage unit.

7. The image forming apparatus according to claim 6, wherein in changing the conveyance path of the printed product, the conveyance path of the printed product is changed further based on a discharge destination of the printed product or a setting of a discharge surface of the printed product.

8. The image forming apparatus according to claim 1, wherein at least one of the plurality of imaging units is mounted above a double-sided conveyance path.

9. The image forming apparatus according to claim 8, wherein in a case that the decided imaging unit is mounted above the double-sided conveyance path, in changing the conveyance path of the printed product, the conveyance path is changed so as to convey the printed product to the double-sided conveyance path.

10. A printing system comprising an image forming apparatus and an information processing apparatus,
the image forming apparatus including:
a plurality of imaging units;
one or more first memories storing instructions; and
one or more first processors that execute the instructions being configured to
print, in a case that a print job received from the information processing apparatus is a print job for printing a chart for adjustment, the chart based on the print job,
decide, based on the chart, which of the plurality of imaging units is to be used to perform colorimetry of a printed product on which the chart has been printed,
change a conveyance path of the printed product to use the decided imaging unit for the colorimetry of the printed product, and
notify the information processing apparatus of a result of the colorimetry by the decided imaging unit, and
the information processing apparatus including:
one or more second memories storing instructions; and
one or more second processors that execute the instructions being configured to
designate the imaging unit to perform the colorimetry of the printed product printed based on the print job for printing the chart for adjustment, and
designate an adjustment function to be executed based on a result of the colorimetry by the imaging unit,
wherein the print job includes information for designating the imaging unit and information for designating the adjustment function.

11. The printing system according to claim 10, wherein the information for designating the imaging unit and the information for designating the adjustment function are included in identification information of the chart.

12. A method of controlling an image forming apparatus that includes a plurality of imaging units each configured to read an image of a printed product and perform colorimetry, and receives a print job from an information processing apparatus and executes the print job, the method comprising:
printing, in a case that the print job received from the information processing apparatus is a print job for printing a chart for adjustment, the chart based on the print job;
deciding, based on the chart, which of the plurality of imaging units is to be used to perform colorimetry of a printed product on which the chart has been printed in the printing;
changing a conveyance path of the printed product to use the decided imaging unit for the colorimetry of the printed product; and
notifying the information processing apparatus of a result of the colorimetry by the decided imaging unit.

13. A non-transitory computer-readable storage medium for causing a processor to execute a method of controlling an image forming apparatus that includes a plurality of imaging units each configured to read an image of a printed product and perform colorimetry, and receives a print job from an information processing apparatus and executes the print job, the method comprising:
printing, in a case that the print job received from the information processing apparatus is a print job for printing a chart for adjustment, the chart based on the print job;
deciding, based on the chart, which of the plurality of imaging units is to be used to perform colorimetry of a printed product on which the chart has been printed in the printing;
changing a conveyance path of the printed product to use the decided imaging unit for the colorimetry of the printed product; and
notifying the information processing apparatus of a result of the colorimetry by the decided imaging unit.

* * * * *